(12) United States Patent
Cheng

(10) Patent No.: US 6,975,872 B2
(45) Date of Patent: Dec. 13, 2005

(54) ALWAYS-ON METHOD FOR REINFORCING EXISTING MOBILE STATION E911-BASED LOCATION DETECTION SERVICES APPLICATIONS

(75) Inventor: Steven D. Cheng, San Diego, CA (US)

(73) Assignee: BenQ Corporation, Tao-Yuan Hsien (TW)

( * ) Notice: Subject to any disclaimer, the term of this patent is extended or adjusted under 35 U.S.C. 154(b) by 110 days.

(21) Appl. No.: 10/708,795

(22) Filed: Mar. 26, 2004

(65) Prior Publication Data

US 2005/0215230 A1 Sep. 29, 2005

(51) Int. Cl.[7] .......................... H04Q 7/20; H04M 1/00
(52) U.S. Cl. ............... 455/456.1; 455/456.2; 455/453.5; 455/574; 340/825.49
(58) Field of Search .................... 455/404.2, 407, 455/408, 414.2, 436, 404.1, 403, 422.1, 572–574, 455/456.1–456.6; 340/7.33, 7.37, 7.32, 825.49

(56) References Cited

U.S. PATENT DOCUMENTS

| | | |
|---|---|---|
| 6,353,744 B1 | 3/2002 | Wu et al. |
| 6,501,421 B1 | 12/2002 | Dutta et al. |
| 6,603,977 B1 | 8/2003 | Walsh et al. |
| 2002/0052204 A1 * | 5/2002 | Bender et al. ............... 455/450 |

* cited by examiner

Primary Examiner—Rafael Perez-Gutierrez
Assistant Examiner—Jaime M. Holliday
(74) Attorney, Agent, or Firm—Winston Hsu

(57) ABSTRACT

A method of locating a mobile station that is turned off. The method includes turning off the mobile station while keeping a battery of the mobile station intact in the mobile station. The mobile station enters a soft power-off mode after the mobile station has been turned off if the battery of the mobile station has sufficient energy. The mobile station receives paging request messages from at least one base station and the mobile station measures RSSI levels for received paging request messages. The mobile station then selects a current base station for which the mobile station measures a strongest RSSI level. The mobile station handshakes with the current base station to enable the mobile station to camp on the current base station. Next, the mobile station reports its location to the current base station and the current base station informs authorities of the location of the mobile station.

8 Claims, 2 Drawing Sheets

ALWAYS-ON METHOD FOR REINFORCING EXISTING MOBILE STATION E911-BASED LOCATION DETECTION SERVICES APPLICATIONS

BACKGROUND OF INVENTION

1. Field of the Invention

The present invention relates to a location detection of a mobile station, and more specifically, to a method for supporting locating detection services when a mobile user accidentally turns off his mobile station.

2. Description of the Prior Art

There are many location technologies being developed and implemented into mobile stations for estimating the location of the mobile stations. These technologies include Global Positioning System (GPS), Assisted GPS (AGPS), Advanced Forward Link Trilateration (AFLT), Enhanced Observed Time Difference (EOTD), Time Difference of Arrival (TDOA), Angle of Arrival (AOA), and Enhanced Forward Link Trilateration (EFLT). Depending on the location detection technology being adopted into the mobile stations, some location detection technologies can offer a precision of up to 5 meters deviation from the actual location of the mobile station. Thus, when there is an emergency incident, a mobile phone network is capable of locating the mobile users in an efficient way.

Some of the technologies are further implemented to support emergency services such as Emergency 911 (E911) or other similar services. However, all of these features will only work as long as the mobile station is powered on. If the mobile station is powered off, the mobile station will not listen to signals emitted from the base stations and will not report anything to the base stations. Unfortunately, there are many reasons why a mobile user may intentionally or unintentionally turn off his mobile station and then forget to turn the mobile station back on later. These reasons include saving power, blocking all incoming phone calls, blocking all internal scheduled alert messages, and preventing the location of the mobile station from being traced by others. In addition, the user may simply accidentally turn off his mobile station. Regardless of the reason why the mobile station is turned off, emergency services or other authorities are not able to locate the mobile user once the mobile station is turned off. This limitation could prevent the mobile user from getting help that is urgently needed in an emergency situation.

SUMMARY OF INVENTION

It is therefore an objective of the claimed invention to use a soft power-off mode to replace the current actual power-off mode, such that the soft power-off mode will fulfill most of the features provided by an actual power-off mode and also provides basic information to support the location detection services needs, in order to solve the above-mentioned problems.

According to the claimed invention, a method of locating a mobile station when the mobile station is turned off is disclosed. The method includes turning off the mobile station while keeping a battery of the mobile station intact in the mobile station. The mobile station enters a soft power-off mode after the mobile station has been turned off if the battery of the mobile station has sufficient energy. At least one base station of a mobile phone network sends paging request messages for locating the mobile station. The mobile station receives the paging request messages from at least one base station and the mobile station measures Received Signal Strength Indicator (RSSI) levels for received paging request messages. The mobile station then selects a current base station for which the mobile station measures a strongest RSSI level. The mobile station handshakes with the current base station to enable the mobile station to camp on the current base station. Next, the mobile station reports its location to the current base station and the mobile phone network informs authorities of the location of the mobile station.

It is an advantage of the claimed invention that turning the mobile station off changes the state of the mobile station to the soft power-off mode. While in the soft power-off mode, the mobile station is still able to report its location to the mobile phone network and other authorities while at the same time using very little battery power.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
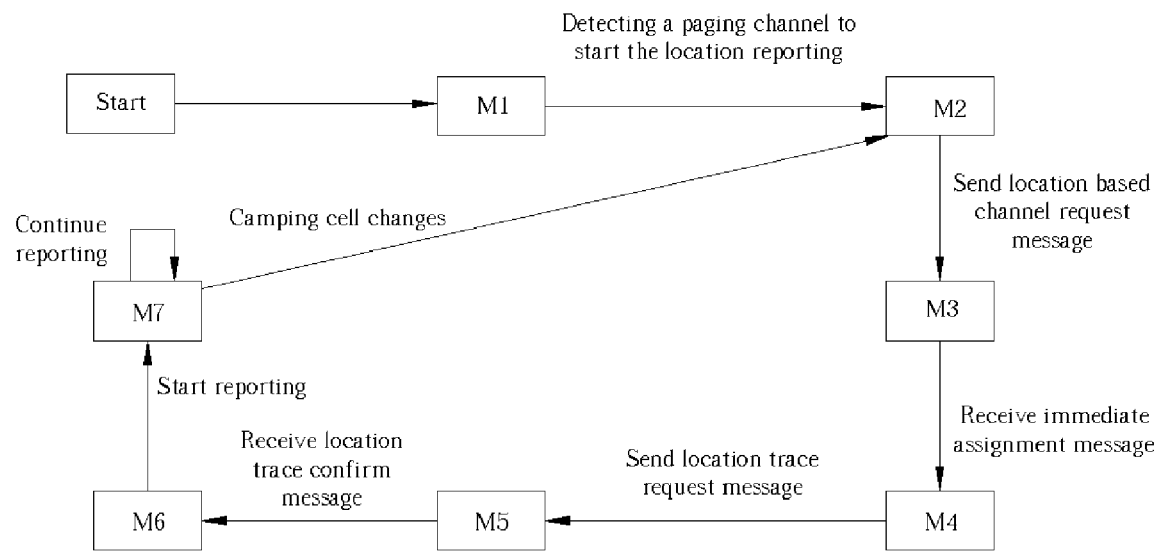
FIG. 1 is a state diagram illustrating operation of a mobile station according to the present invention.

To overcome the problems associated with detecting the location of a mobile station that is turned off, the present invention divides the current power-off mode in the existing wireless protocol standards into an actual power-off mode and a soft power-off mode. The actual power-off mode is only entered when the mobile station loses all battery energy or when an initial International Mobile Subscriber Identity (IMSI) is not registered to a mobile phone network. Otherwise, the mobile station enters the soft power-off mode when the mobile station is turned off.

Once the IMSI of the mobile station is successfully registered to the network, an E911 call center or another authority can use the mobile station to locate the user of the mobile station. Thus, even if the user turns off his mobile station, the mobile station is still capable of responding to special E911 related location service requests automatically. As will be shown below, when the mobile station is in a power saving mode or a Discontinuous Reception (DRX) mode, the present invention location reporting method can be integrated with the existing cell selection and reselection algorithm. The present invention scheme will take much less battery energy compared with the energy used in the DRX mode, but it will also guarantee that the E911 location tracing capability is always on.

The soft power-off feature will now be described in greater detail. Since the soft power-off feature allows authorities to trace the location of the mobile station, assume the location of the mobile stations will only be traced legally. The soft power-off feature is preferably used to replace the current actual power-off feature. In the soft power-off mode, the mobile station will not answer any incoming calls. The mobile station will also not take any action to respond to alerting events and will not send any Short Message Service (SMS) messages to any other party. In the soft power-off mode, the mobile station shuts down most of its circuitry as it does in the power saving mode or DRX mode.

However, in the DRX mode, when a DRX timer expires, the mobile station will wake up and listen to the paging mode to see whether the mobile phone network wants to communicate with the mobile station. In the DRX mode, the mobile station will also monitor the Received Signal Strength Indicator (RSSI) levels of the serving cell and neighboring cells for cell selection and reselection purposes.

On the other hand, in the present invention soft power-off mode, the mobile station will not listen to the paging channels for voice, data, and SMS services, and it will not perform the complicated cell selection and reselection algorithm. The mobile station in the soft power-off mode only listens to the base station having the strongest RSSI levels and measures the RSSI levels of nearby base stations. Once the measurement report is completed, the mobile station will setup a channel with the mobile phone network, send the measurement report to the mobile phone network, and cease normal communication between the mobile phone network and mobile station. Therefore, the present invention soft power-off mode uses much less battery energy that what is used in the DRX mode.

Unlike the DRX mode that is granted only after the location registration is successful, the present invention soft power-off mode will start right after the mobile station is connected with the battery, and no Subscriber Identity Module (SIM) and access control issues checking is needed. Thus, the registered mobile stations can report its location to any operator's mobile phone network. However, non-registered mobile stations will not be capable of reporting their location because it is assumed that no user owns the non-registered mobile station. Thus, there is no need to trace the location of a non-registered mobile station.

The user may take the battery out of the mobile station or use some special feature on the mobile station to make the mobile station enter the actual power-off mode. When the mobile station is in the soft power-off mode, the mobile phone network can activate the location reporting process when an emergency scenario is identified. Thus, during the soft power-off mode, the mobile station initially will listen to the paging channels to see whether the mobile phone network requests this kind of attention, and the mobile station will ignore other paging request messages.

Please refer to FIG. 1. FIG. 1 is a state diagram illustrating operation of the mobile station according to the present invention. When the mobile station is in the soft power-off mode, the mobile station transitions into state M1 to begin communicating with the mobile phone network for reporting its location to the mobile phone network. The mobile station transitions into state M2 by detecting a paging request message transmitted by at least one base station on a paging channel in the mobile phone network. The mobile station measures the RSSI levels of the paging request messages transmitted by nearby base stations, and chooses a current base station to camp on that has the strongest RSSI level.

After choosing the current base station, the mobile station beings handshaking with the current base station. The mobile station transitions into state M3 by sending a location based channel request message to the current base station, and transitions into state M4 by receiving an immediate assignment message from the current base station. The mobile station transitions into state M5 by sending a location trace request message to the current base station, and transitions into state M6 upon receiving a location trace confirm message.

The mobile station transitions into state M7 when the mobile station reports its location to the mobile phone network through the current base station. As long as the base station that the mobile station is camping on is still the current base station, the mobile station will stay in state M7. When the cell that the mobile station is camping on changes, the state diagram transitions to state M2 to begin communicating with a new base station.

Figure 2:
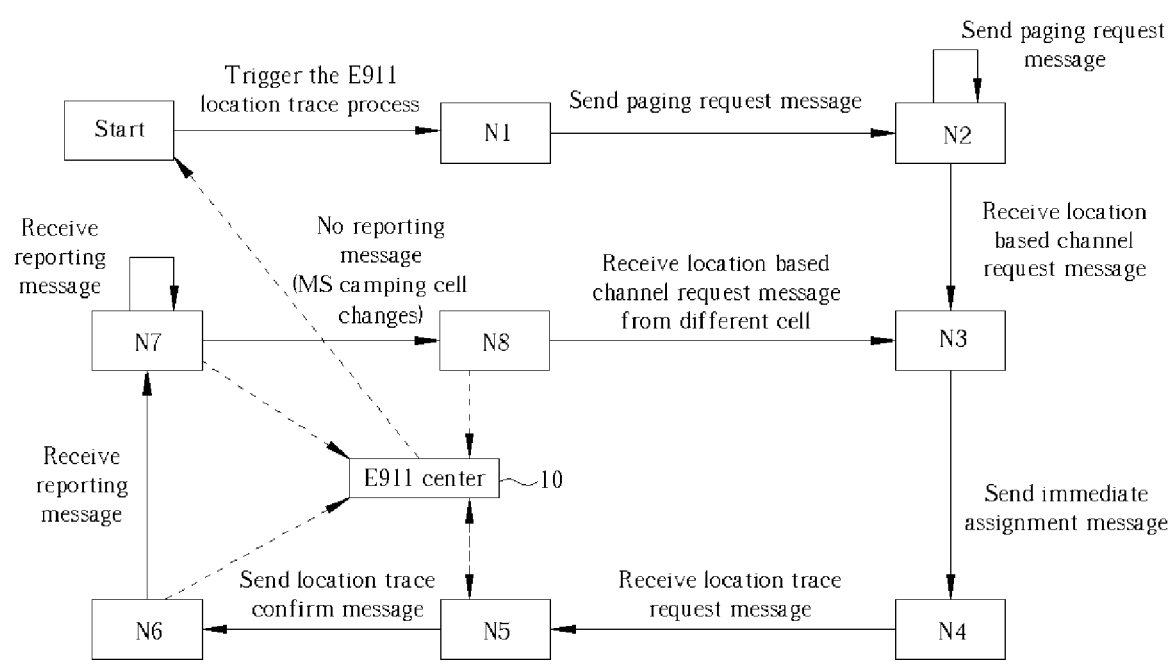
FIG. 2 is a state diagram illustrating operation of a mobile phone network according to the present invention.

Please refer to FIG. 2. FIG. 2 is a state diagram illustrating operation of the mobile phone network according to the present invention. When the mobile phone network is used to locate the mobile user during an emergency incident (such as when an Emergency 911 call center 10 is trying to locate the mobile user), the mobile phone network transitions into state N1. To contact the mobile user, the mobile phone network transitions into state N2 while utilizing at least one base station to send a paging request message to the mobile station. The mobile phone network stays in state N2 and continues to send paging request messages to the mobile station until a location based channel request message is received from the mobile station, at which time the mobile phone network transitions into state N3.

The mobile phone network transitions into state N4 by sending an immediate assign message to the mobile station, and transitions into state N5 by receiving a location trace request message from the mobile station. While in state N5, the mobile phone network will directly forward each location trace request message that the base station receives from the mobile station to the E911 call center 10. The E911 call center 10 will then send a location trace confirmation message to the mobile station, which moves the flow into state N6.

Once the mobile phone network begins receiving reports of the location of the mobile station, the mobile phone network transitions into state N7. As long as the mobile phone network continues to receive location reports from the mobile station, the mobile phone network stays in state N7. When the mobile phone network receives location reports from the mobile station, the mobile phone network informs the E911 call center 10 of the new location of the mobile station.

If the mobile phone network stops receiving reporting messages from the mobile station, it is assumed that the mobile station is now camping on a different cell, and the mobile phone network transitions to state N8. The mobile phone network reports this change in cell location to the E911 call center 10. When the mobile phone network receives a location based channel request message from a mobile station in a different cell, the state diagram transitions back to state N3.

Assume that the handshaking protocol for the E911 location service has been established. The mobile station will report its location in the given channel and at a given time frame if the mobile station still camps on the same base station, and the base station will listen to the mobile station at the same given channel and at the given time frame. If the mobile station now camps on a different base station, the mobile station will stop reporting its location and will start to listen to the paging channels. When the mobile phone network cannot receive the reporting message from the mobile station, it will issue the paging request message to the mobile station to reestablish the dedicated channel. When the mobile station changes the cell to camp on, it will continue to listen to the paging channels for a period of time, x, that is known by the mobile phone network. Under this condition, the mobile phone network will automatically send the paging request message within x period of time to try to contact the mobile station. If the mobile station cannot receive any paging request messages regarding the E911 location detection service, the mobile station will take the initiative by sending channel request messages to the mobile phone network to establish the handshaking protocol. Once the handshaking protocol is established, the mobile phone network can specify the next reporting period. Each location trace request message received by the base station will be forwarded directly to the E911 call center 10, and the E911 call center 10 will send the location trace confirm message to the base station for the base station to transmit to the mobile station.

The mobile station can also report its battery power level to the mobile phone network. When the battery power level is low, the mobile phone network will extend the E911 location detection service reporting period, thereby saving the battery power of the mobile station and allowing the mobile station to be used for a longer period of time.

The present invention can be incorporated into the existing Global System for Mobile communications (GSM) protocol. Once the mobile station starts to camp on a cell successfully, that is the location based channel request is accepted by the camping cell, the mobile phone network is able to contact the cellular phone. The existing GSM protocol utilizes DRX mode for minimizing the battery usage of mobile stations. Please refer back to FIG. 1. During the DRX mode, when the mobile station receives the paging request message to start the location trace process, the mobile station will change its state from DRX mode to state M2 initially, gradually transition to state M7, and then change back to DRX mode. If the cell that the mobile station is camping on has not changed, when the mobile station wakes up in the next DRX cycle, and after the associated tasks have been executed, the mobile station will change to state M7 and then change back to DRX mode. If the serving cell gets changed, after the associated tasks have been executed, the mobile station will change to state M2 initially, gradually transition to state M7, and then change back to DRX mode. Besides the GSM protocol, this concept can also be applied to the Code Division Multiple Access (CDMA) protocol and other protocols in a similar way.

In summary, the present invention offers a method for altering existing communication protocols such as the GSM protocol to support location detection services while a mobile station is in soft power-off mode. When the mobile station is turned off, the soft power-off mode is entered by default if the mobile station contains an IMSI that is registered to a mobile phone network and so long as the mobile station has remaining battery power. The mobile station running in soft power-off mode allows the mobile station to consume very little battery power while at the same time providing the ability for the an emergency call center to locate the mobile station via the mobile phone network.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of locating a mobile station when the mobile station is turned off, the method comprising:

turning off the mobile station while keeping a battery of the mobile station intact in the mobile station;

the mobile station entering a soft power-off mode after the mobile station has been turned off if the battery of the mobile station has sufficient energy;

at least one base station of a mobile phone network sending paging request messages for locating the mobile station;

the mobile station receiving the paging request messages from at least one base station;

the mobile station measuring Received Signal Strength Indicator (RSSI) levels for received paging request messages and the mobile station selecting a current base station for which the mobile station measures a strongest RSSI level;

handshaking between the mobile station and the current base station to enable the mobile station to camp on the current base station;

the mobile station reporting its location to the current base station; and the mobile phone network informing authorities of the location of the mobile station.

2. The method of claim 1 wherein handshaking between the mobile station and the current base station comprises:

the mobile station sending a location based channel request message to the base station;

the base station sending an immediate assignment message to the mobile station in response to receiving the location based channel request message from the mobile station;

the mobile station sending a location trace request message to the base station in response to receiving the immediate assignment message from the base station; and the base station sending a location trace confirmation message to the mobile station in response to receiving the location trace request message from the mobile station.

3. The method of claim 1 wherein when the mobile station camps on a new base station that is different from the current base station, the mobile station begins handshaking with the new base station before reporting its location to the new base station.

4. The method of claim 3 wherein to initiate handshaking between the new base station and the mobile station, at least one base station sends paging request messages for locating the mobile station within a predetermined period of time after the mobile phone network stops receiving messages from the mobile station reporting the location of the mobile station.

5. The method of claim 4 wherein if the mobile station does not receive any paging request messages from at least one base station within the predetermined period of time, the mobile station sends location based channel request messages to the mobile phone network to initiate handshaking.

6. The method of claim 1 wherein after handshaking is established between the mobile station and the current base station, the mobile phone network is capable of specifying when the mobile station should next report its location to the mobile phone network.

7. The method of claim 6 wherein the mobile station is capable of reporting its battery level to the mobile phone network, and if the battery level of the mobile station is low, the mobile phone network extends the period in which the mobile station should next report its location to the mobile phone network.

8. The method of claim 1 wherein the mobile station enters the soft power-off mode after the mobile station has been turned off if the battery of the mobile station has sufficient energy and if an International Mobile Subscriber Identity (IMSI) of the mobile station is successfully registered to the mobile phone network.

* * * * *